United States Patent
Loniak

(10) Patent No.: US 7,066,594 B2
(45) Date of Patent: *Jun. 27, 2006

(54) RIMLESS EYEWEAR

(75) Inventor: Jacob Loniak, Anaheim, CA (US)

(73) Assignee: ORB Eyewear, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/915,873

(22) Filed: Aug. 10, 2004

(65) Prior Publication Data

US 2005/0036102 A1    Feb. 17, 2005

Related U.S. Application Data

(63) Continuation-in-part of application No. 10/638,760, filed on Aug. 11, 2003, now Pat. No. 6,805,441.

(51) Int. Cl.
    *G02C 1/02*    (2006.01)
(52) U.S. Cl. .................................... 351/110; 351/124
(58) Field of Classification Search ............. 351/110, 351/140, 178, 124, 154, 41
    See application file for complete search history.

(56) References Cited

U.S. PATENT DOCUMENTS

| 5,646,706 | A    | 7/1997  | Izumitani |
|-----------|------|---------|-----------|
| 6,217,169 | B1   | 4/2001  | Hirschman |
| 6,250,755 | B1   | 6/2001  | Conner    |
| 6,805,441 | B1 * | 10/2004 | Loniak ...................... 351/110 |

\* cited by examiner

*Primary Examiner*—Hung Xuan Dang
(74) *Attorney, Agent, or Firm*—Gene Scott & Patent Law & Venture Group

(57) ABSTRACT

A rimless eyewear has a symmetrical placement of components about a bridge (2). The bridge (2) is attached directly to a peripheral edge (3) of a left lens (4) and a right lens (5) by a welding technique. Likewise, end-pieces (6) and (7) are attached directly to the peripheral edge (3) of the lenses (4) and (5) on either side. A left temple-piece (8) is attached to the left end-piece (6), and a separate right temple-piece (9) is attached to the right end-piece (7) by a mechanical means such as by hinges, pins, screws or brackets. In an alternate embodiment, lug-pieces (10) are welded to the peripheral edge (3) of the lenses (4) and (5) and the end-pieces (6) and (7) and the bridge-piece (2) are engaged with the lug-pieces (10

6 Claims, 1 Drawing Sheet

RIMLESS EYEWEAR

RELATED APPLICATIONS

This application is a Continuation-in-Part of application Ser. No. 10/638,760, filed on Aug. 11, 2003 with title, "Rimless Eyewear," now U.S. Pat. No. 6,805,441, and as such, the present application claims the priority date of Aug. 11, 2003.

INCORPORATION BY REFERENCE

Applicant hereby incorporates herein by reference, the U.S. Pat. Nos. 6,217,169; 6,250,755; 6,485,141; 5,505,870; 6,312,126; 6,007,200; 6,210,002; 5,646,706; Re37,425; and Re374,461 which are referred to below.

BACKGROUND OF THE INVENTION

1. Field of the Invention

This invention relates to rimless eyewear constructed entirely without the use of adhesives or the need for mechanical attachments anywhere on the front or rear surfaces of the lenses and more particularly to such eyewear wherein several of its components are welded together.

2. Description of Related Art

One of the main advantages of rimless eyewear is the wide, unobstructed field of view. Another advantage is the relatively low weight afforded by its design. Most, so-called, "rimless" eyewear is, however, only semi-rimless where lenses are suspended between eyewear components, such as a bridge and end-pieces, by means of a thin flexible strand providing the function of a frame, or rim; or by components mounted on the lens surfaces using adhesives or mechanical attachments. Where a flexible strand is not employed, these eyewear components are usually supported by means of screws fitted into holes formed through the lens surface. The bridge provides a connection between the two lenses, and positions the eyewear over the nose. End-pieces are located at the outer edge of the lenses on both left and right sides, and are the means by which temples are connected to the lenses. Temples are elongate side pieces that use the ears for providing stability to the lenses.

Hirschmann, et al, U.S. Pat. No. 6,217,169 describes a semi-rimless form having a thin, flexible strand wrapped around each of the lenses. It is to this strand that the bridge and end-piece components are attached by mechanical means. Even though the field of view is unobstructed, the flexible strand and its concomitant mechanical attachment does add weight to the eyewear.

Connor, et al, U.S. Pat. No. 6,250,755; Masunaga, U.S. Pat. No. 5,585,870; Yoshida, U.S. Pat. Nos. 6,485,141 and 6,312,126, and Tachibana, U.S. Pat. Nos. 6,007,200 and 6,210,002, all teach rimless eyewear construction wherein the eyewear components are attached to the lenses by mechanical means involving screws, pins or clamps. These points of attachment usually invade the field of view and add weight to the pair of glasses.

Izumitami, U.S. Pat. Nos. 5,646,706; Re37,425; and Re37,461, all teach a similar rimless eyewear construction wherein the eyewear components are attached to the lenses by inserting and cementing pins into holes drilled in the lens itself. Even though elimination of the use of mechanical means of attachment minimizes the weight of the eyewear, this design approach covers a portion of the field of view by taking up space on the lens surfaces.

At this time, no teaching has shown how to produce an eyewear entirely without the use of adhesives, or the need for mechanical attachments within the field of view of the lens. Our prior art search shows that it is known to assemble a pair of glasses with bonding agents, and with rivets, screws and other mechanical hardware, however, the prior art does not fairly teach or show an eyewear that is constructed by welding technique so as to produce a highly durable and strong assembly with both lenses fully clear of any attachment elements. The present invention fulfills these needs and provides further related advantages as described in the following summary.

SUMMARY OF THE INVENTION

The present invention is a rimless eyewear, i.e., pair of glasses, constructed entirely without the need for drilling holes in, or placement of adhesives or mechanical attachments on, the surfaces of its lenses.

This rimless eyewear comprises a right and a left lens, each providing a peripheral lens edge. To this edge are attached the eyewear components: left and right end-pieces, using an integral bonding technique such as welding, and a bridge joined between the lenses in the same manner. The bridge provides nose contact surfaces so that the weight of the eyewear rests primarily on the bridge of the nose. Left and right temple-pieces are attached to the end-pieces in a traditional manner, such as by a small hinge, so that the temple pieces may be folded for storing the eyewear.

Until the design and method described here, no construction of rimless eyewear has provided for attaching eyewear components to the lens entirely without the use of adhesives or the need for mechanical attachments within the viewing aperture of the lens. By taking advantage of integral bonding techniques such as thermal fusion, eyewear components made of plastic, plastic with metal, or hybrid materials may be directly attached to one another. Such bonds may be formed so as to exhibit superior strength commensurate with the bulk material.

Since thermal fusion and related techniques takes place at and between the surfaces of the joined parts, the eyewear components can be attached directly to the peripheral edge of the lens, keeping these components fully outside of the field of view. Also, since no mechanical attachment hardware is used, the weight of the finished eyewear is minimized.

A primary objective of the present invention is to provide an apparatus and method of use of such apparatus that yields advantages not taught by the prior art.

Another objective of the invention is produce an eyewear that is lighter in weight than former eyewear products.

A further objective of the invention is to assemble an eyewear by joining its components in such manner as to achieve a joint with bulk material strength properties and without the use of agents or catalysts.

A still further objective of the invention is to produce an eyewear with no obstruction on the surfaces of its lenses.

A still further objective of the invention is to produce an eyewear that is able to be assembled rapidly, by automated means and which results in a monolithic integral appearance.

Other features and advantages of the embodiments of the present invention will become apparent from the following more detailed description, taken in conjunction with the accompanying drawings, which illustrate, by way of example, the principles of at least one of the possible embodiments of the invention.

DESCRIPTION OF THE DRAWINGS

The details and many of the advantages provided by this invention will become clear and will be better understood by reviewing the following description and accompanying drawings, wherein.

DETAILED DESCRIPTION OF THE INVENTION

The above described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

The process of fusing materials together is commonly referred to as "welding" and the word "welding" is used in this document to refer to a family of attachment techniques which fuse or bond two separate parts together by exciting the molecules of the parts at a junction 18 so that the molecules interconnect and engage each other in the same manner and in forming the same structural system as the bulk material. "Welding" as used herein refers to only those techniques that result in junctions 18 formed by only the two parts that are to be connected and such joints are permanent. In the present invention eyeglass lenses and associated eyewear components are both made of plastic rather than glass. The finished product is eyewear that is properly positioned on a person's face, for blocking excessive light or particles from reaching the eyes and for all other purposes that one may manufacture or use eyeglasses or goggles for.

Any one of a variety of techniques may be employed in accordance with the invention so as to secure eyewear components to lenses and these include the techniques that are commonly referred to as: vibration welding, sonic welding, laser welding, particle magnetic welding, plate welding, and others. All provide similar results. All are based on local heating of the junction 18 of two parts to a temperature beyond the point where the material softens. Both sides of the junction 18 reach a semi-liquid state wherein, due to physical contact, molecular interaction occurs between the two parts, and when completed properly, the two parts actually become one at their interface.

Figure 1:
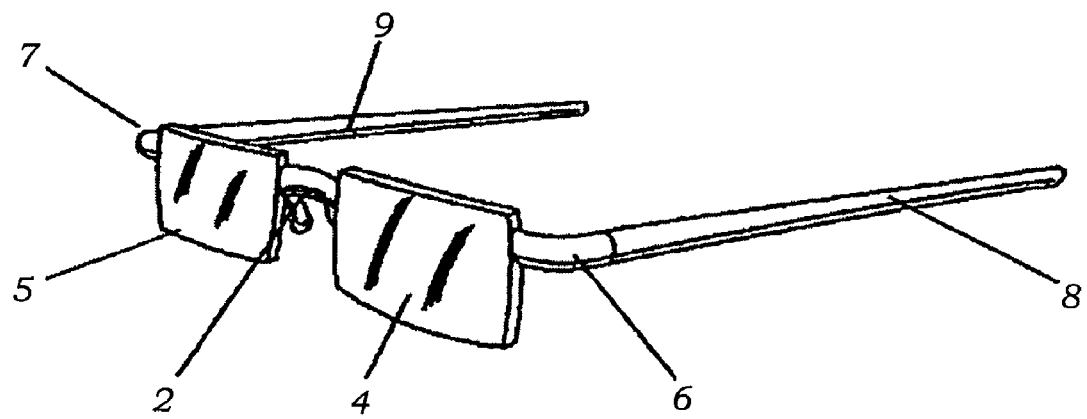
FIG. 1 is a perspective view of a rimless eyewear constructed by welding technique.

In FIG. 1 the invention is shown with lenses 4 and 5, and eyewear components: bridge-piece 2, end-pieces 6 and 7; and temples 8 and 9.

Figure 2:
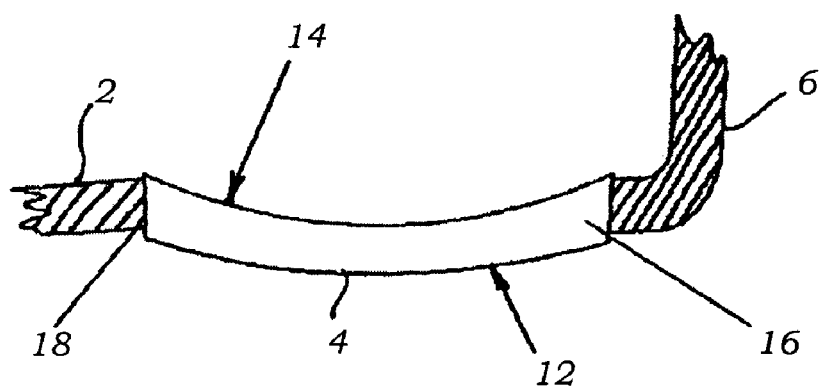
FIG. 2 is a partial lens-edge view, in partial section, of one lens thereof showing the attachment of eyewear components directly to the lens in a first embodiment.
Figure 3:
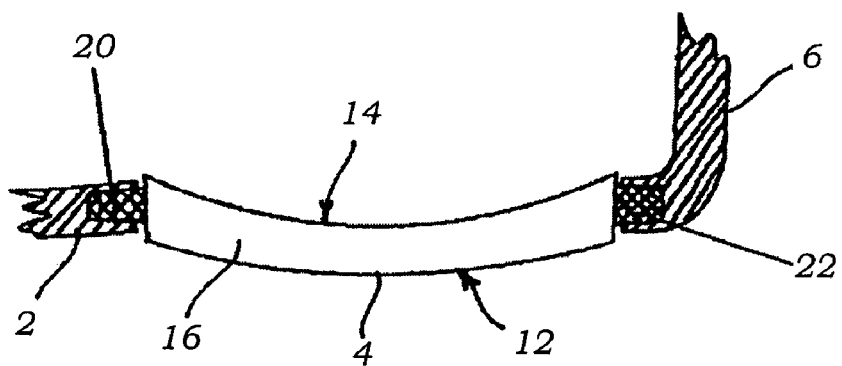
FIG. 3 is a partial lens-edge view, in partial section, of the one lens thereof showing the attachment of eyewear components to the lens using intermediary lugs.

The present invention is a rimless eyewear, where in one embodiment, a right lens 5 and a left lens 4 each provide a pair of opposing lens surfaces 12 and 14 and a peripheral edge 16; see FIGS. 2 and 3. A right end-piece 7 is welded to the peripheral edge 16 of the right lens 5 and a left end-piece 6 is welded to the peripheral edge 16 of the left lens 4. A bridge-piece 2 is welded at opposing ends thereof to the peripheral edges 16 of the right 5 and left 4 lenses respectively. The left end-piece 6, the right end-piece 7, and the bridge-piece 2, each are positioned exclusive of the pair of opposing lens surfaces 12 and 14 so that the view through the lenses 4 and 5 is not obstructed. A right temple-piece 9 is engaged with the right end-piece 7 and a left temple-piece 8 is engaged with the left end-piece 6, whereby, with the bridge-piece 2 placed on a person's nose, and with the temple-pieces 8 and 9 engaged with the person's ears, the left and right lenses 4 and 5 are positioned correctly on a persons face and provide an unobstructed view through the lenses.

Preferably, the right 7 and left 6 end-pieces and the bridge-piece 2 each form welded junctions 18 with the right 5 and left 4 lenses, wherein the welded junctions 18 are formed and established by at least one of: ultrasonic welding, sonic welding, laser welding, magnetic particle welding, induction welding, and heated plate welding. These junctions 18 may be formed by other welding techniques then those listed here in accordance with the scope and purpose of the invention. These junctions 18 may be one or more of the well-known and common joints including: a butt joint, a shear joint, a step joint, a tongue-in-grove joint, or other types of joints as necessary for forming a strong interconnection of parts.

In an alternate embodiment of the present invention, shown in FIG. 3, a pair of inner lug-pieces 20 and a pair of outer lug-pieces 22 are welded in inner and outer opposing locations to each one of the right 5 and left 4 lenses. FIG. 3 shows this arrangement for the left lens 4, and it should be realized that the mirror image of FIG. 3 is representative of the right lens 5. The right end-piece 7 and a left end-piece 6 are then engaged with the outer lug-pieces 22 on the lenses 4 and 5 and the bridge-piece 2 is engaged at opposing ends thereof to the inner lug-pieces 20 on the lenses 4 and 5.

The inner 20 and outer 22 lug-pieces form welded junctions 18 with the right 5 and left 4 lenses interfacing with the peripheral edge 16, wherein the welded junctions 18 are established by at least one of: ultrasonic welding, sonic welding, laser welding, magnetic particle welding, induction welding, and heated plate welding. As defined above, the welded junctions 18 form at least one of a butt joint, a shear joint, a step joint, and a tongue-in-grove joint.

Materials used in the preferred embodiments are those thermoplastic materials that have structural, optical and appearance qualities consistent with the eyewear industry and includes polycarbonate and polystyrene.

In the preferred embodiments, the non-welded engagements are formed using well-known and common means of attachment.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A rimless eyewear comprising: a right lens and a left lens, the right and left lenses each providing a pair of opposing lens surfaces and a peripheral edge; a right end-piece welded to the peripheral edge of the right lens and a left end-piece welded to the peripheral edge of the left lens; a bridge-piece welded at opposing ends thereof to the peripheral edges of the right and left lenses respectively; the left end-piece, the right end-piece, and the bridge-piece, each positioned exclusive of the front and rear lens surfaces of the right and left lenses; and, a right temple-piece engaged with the right end-piece and a left temple-piece engaged with the left end-piece, whereby, with the bridge-piece placed on a person's nose, and with the temple-pieces engaged with the person's ears, the left and right lenses are positioned correctly on a person's face and provide an unobstructed view through the opposing lens surfaces.

2. The rimless eyewear of claim 1 wherein the right and left end-pieces and the bridge-pieces form welded junctions with the right and left lenses, the welded junctions established by at least one of: ultrasonic welding, sonic welding, laser welding, magnetic particle welding, induction welding, and heated plate welding.

3. The rimless eyewear of claim 2 wherein the welded junctions form at least one of a butt joint, a shear joint, a step joint, and a tongue-in-grove joint.

4. A rimless eyewear comprising: a right lens and a left lens, the right and left lenses each providing a pair of opposing lens surfaces and a peripheral edge; a pair of inner lug-pieces and a pair of outer lug-pieces, the lug-pieces welded in inner and outer opposing locations to each one of the right and left lenses; a right end-piece and a left end-piece, each end-piece engaged with one of the outer lug-pieces of one of the lenses; a bridge-piece engaged at opposing ends thereof to the inner lug-pieces of the lenses; the left end-piece, the right end-piece, and the bridge-piece, each positioned exclusive of the pair of opposing lens surfaces of the lenses; and, a right temple-piece engaged with the right end-piece and a left temple-piece engaged with the left end-piece, whereby, with the bridge-piece placed on a person's nose, and with the temple-pieces engaged with the person's ears, the left and right lenses are positioned correctly on a person's face, and whereby, the person has an unobstructed view through the opposing lens surfaces.

5. The rimless eyewear of claim 4 wherein the inner and outer lug-pieces form welded junctions with the right and left lenses, the welded junctions established by at least one of: ultrasonic welding, sonic welding, laser welding, magnetic particle welding, induction welding, and heated plate welding.

6. The rimless eyewear of claim 5 wherein the welded junctions form at least one of a butt joint, a shear joint, a step joint, and a tongue-in-grove joint.

* * * * *